US009942393B2

(12) United States Patent
Ushio et al.

(10) Patent No.: US 9,942,393 B2
(45) Date of Patent: Apr. 10, 2018

(54) AUDIO CHAT MANAGEMENT DEVICE AND METHOD

(71) Applicant: DeNA Co., Ltd., Tokyo (JP)

(72) Inventors: Masato Ushio, Tokyo (JP); Teppei Fujisawa, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 15/319,299

(22) PCT Filed: May 27, 2015

(86) PCT No.: PCT/JP2015/065254
§ 371 (c)(1),
(2) Date: Dec. 15, 2016

(87) PCT Pub. No.: WO2015/194339
PCT Pub. Date: Dec. 23, 2015

(65) Prior Publication Data
US 2017/0118334 A1    Apr. 27, 2017

(30) Foreign Application Priority Data
Jun. 17, 2014 (JP) .................................. 2014-124397

(51) Int. Cl.
H04M 3/42 (2006.01)
H04L 29/06 (2006.01)
H04M 1/725 (2006.01)

(52) U.S. Cl.
CPC .... H04M 3/42374 (2013.01); H04L 65/1069 (2013.01); H04L 65/1096 (2013.01); H04M 1/7255 (2013.01)

(58) Field of Classification Search
CPC ............ H04M 3/42374; H04M 1/7255; H04L 65/1069; H04L 65/1096
(Continued)

(56) References Cited

U.S. PATENT DOCUMENTS 6,807,562 B1 * 10/2004 Pennock ............. H04L 12/1818
463/42
2005/0245317 A1 * 11/2005 Arthur .................... A63F 13/12
463/42
(Continued)

FOREIGN PATENT DOCUMENTS

JP    2007-047887 A    2/2007
JP    2009-199198 A    9/2009
(Continued)

OTHER PUBLICATIONS

International Preliminary Report on Patentability and the Written Opinion of the International Searching Authority as issued in International Patent Application No. PCT/JP2015/065254, dated Dec. 20, 2016.
(Continued)

Primary Examiner — William Nealon
(74) Attorney, Agent, or Firm — Pillsbury Winthrop Shaw Pittman LLP

(57) ABSTRACT

A server according to one embodiment includes an information storage unit that store various types of information; a notification information transmission unit that transmits predetermined notification information to a terminal device of an invited user who is invited to a voice chat in response to receiving a voice chat initiation request from a terminal device of a requesting user; a state monitor unit that monitors whether the requesting user and the invited user are in an available state in which they are able to perform a voice chat; and a voice chat control unit that enables a voice chat communication between the terminal device of the requesting user and the terminal device of the invited user when the requesting user and the invited user are in the available state. The server serves as a voice chat management device that
(Continued)

manages a voice chat between users who operate their terminal devices.

20 Claims, 15 Drawing Sheets

(58) Field of Classification Search
USPC .................................................. 455/414.1
See application file for complete search history.

(56) References Cited

U.S. PATENT DOCUMENTS

| | | | |
|---|---|---|---|
| 2006/0234735 A1* | 10/2006 | Digate | H04L 51/04 455/466 |
| 2007/0201376 A1* | 8/2007 | Marshall-Wilson | H04L 45/00 370/252 |
| 2010/0093442 A1 | 4/2010 | Yoshinobu et al. | |
| 2012/0005599 A1* | 1/2012 | Bastide | G06Q 10/101 715/753 |
| 2015/0087425 A1 | 3/2015 | Yoshinobu et al. | |

FOREIGN PATENT DOCUMENTS

| | | |
|---|---|---|
| JP | 2009-223656 A | 10/2009 |
| JP | 2010-097279 A | 4/2010 |
| JP | 2014-050745 A | 3/2014 |
| WO | WO 2011/077501 A1 | 6/2011 |

OTHER PUBLICATIONS

International Search Report as issued in International Patent Application No. PCT/JP2015/065254, dated Aug. 18, 2015.
Final Office Action as issued in Japanese Patent Application No. 2014-124397, dated Apr. 14, 2015.
Non-Final Office Action as issued in Japanese Patent Application No. 2014-124397, dated Nov. 11, 2014.
Notice of Refusal Ground as issued in Korean Patent Application No. 10-2016-7032661, dated May 30, 2017.
New Function update of Voice-talk for voice chat in KakaoTalk version 2.8.0, Feb. 1, 2012, Retrieved from the Internet: URL: http://designnatsu.blog.me/100149866756.

* cited by examiner

User Information Management Table 51a

| User ID |
| --- |
| Basic Information |
| Friend Information |
| Audio Stamp Information |
| Login State |
| ... |

Fig. 3

Chat Unit Information Management Table 51b

| Chat Unit ID |
| --- |
| Member Information (User ID, Availability Flag, etc. ) |
| ... |

Fig. 4

AUDIO CHAT MANAGEMENT DEVICE AND METHOD

TECHNICAL FIELD

CROSS-REFERENCE TO RELATED APPLICATIONS

This application is the U.S. National Stage of PCT/JP2015/065254, filed on May 27, 2015, which is based on and claims the benefit of priority from Japanese Patent Application Serial No. 2014-124397 (filed on Jun. 17, 2014), the contents of which are hereby incorporated by reference in their entirety. The present invention relates to an voice chat management device and a method thereof, more specifically, a voice chat management device that manages voice chats performed between users and a method thereof.

BACKGROUND

Application programs (hereunder may be simply referred to as "app(s)") for performing text chats in which users exchange their text messages via terminal devices such as smartphones have been provided (for example, see Patent Literature 1). In the text chats using such an app, two or more users form a group and when members of the group input text messages for the chat group, the messages are sequentially shown in chronological order on the terminal device of each user who belongs to the chat group (each member of the chat group).

RELEVANT REFERENCES

List of Relevant Patent Literature

Patent Literature 1: Japanese Patent Application Publication No. 2014-050745

In the above-described text chats, users can enjoy conversation using text messages more easily compared to conventional e-mails. However there may be some disadvantages caused by using text messages. For example, text massages remain as history so that users may have to be very careful in making remarks (sending text messages) and may feel a sense of obligation to replay each time he/she sees others' messages. Moreover, there is a limit for real-time communication for the text messages since users have to take a long time to input, send and see (display) text messages.

Whereas a voice chatting using a mechanism such as an Internet telephony allows a real-time communication without the text messages. However it cannot be said that the voice chatting is not providing communication that exceeds a conventional telephone communication. For instance, an Internet telephony system requires for a user to check whether an intended party is on the desk (on line) and then make a call, and for the intended party to receive the call. Such a process may cause some people to feel reluctant to start communication over the Internet telephone.

SUMMARY

One object of embodiments of the present invention is to allow users to start a voice chat with other user more easily. Other objects of the embodiments of the present disclosure will be apparent with reference to the entire description in this specification.

A voice chat management device according to one embodiment of the invention is a device that manages a voice chat between users. The device includes one or more computer processors configured to execute instructions, and in response to execution of the instructions, further configured to: transmit predetermined notification information to a terminal device of a second user in response to receiving a voice chat initiation request to chat with the second user from a terminal device of the first user; monitor whether the first user and the second user are in an available state where the user is able to perform a voice chat; and enable a voice chat communication between the terminal device of the first user and the terminal device of the second user when the first user and the second user are in the available state.

A voice chat management device according to another embodiment of the invention is a device that manages a voice chat between users. The device includes one or more computer processors configured to execute instructions, and in response to execution of the instructions, further configured to: determine, in response to receiving a voice chat initiation request to chat with the second user from a terminal device of a first user; whether a second user is in an available state where the second user is able to perform a voice chat; and enable a voice chat communication between the terminal device of the first user and a terminal device of the second user when it is determined that the second user is in the available state.

A method for management of a voice chat performed between users by using one or more computers according to one embodiment of the invention includes causing the one or more computers to: transmit predetermined notification information to a terminal device of a second user in response to receiving a voice chat initiation request to chat with the second user from a terminal device of the first user; monitor whether the first user and the second user are in an available state where the user is able to perform a voice chat; and enable a voice chat communication between the terminal device of the first user and the terminal device of the second user when the first user and the second user are in the available state.

A method for management of a voice chat performed between users according to another embodiment may include determining, in response to receiving a voice chat initiation request to chat with the second user from a terminal device of a first user, whether a second user is in an available state where the second user is able to perform a voice chat; and enabling a voice chat communication between the terminal device of the first user and a terminal device of the second user when it is determined that the second user is in the available state.

According to various embodiments of the invention, it is possible to allow users to start a voice chat with other user(s) more easily.

BRIEF DESCRIPTION OF THE DRAWINGS

FIG. 3 is a diagram showing an example of information managed by a user information management table 51a according to an embodiment.

FIG. 4 is a diagram showing an example of information managed by a chat unit information management table 51b according to an embodiment.

DESCRIPTION OF THE PREFERRED EMBODIMENTS

Figure 1:
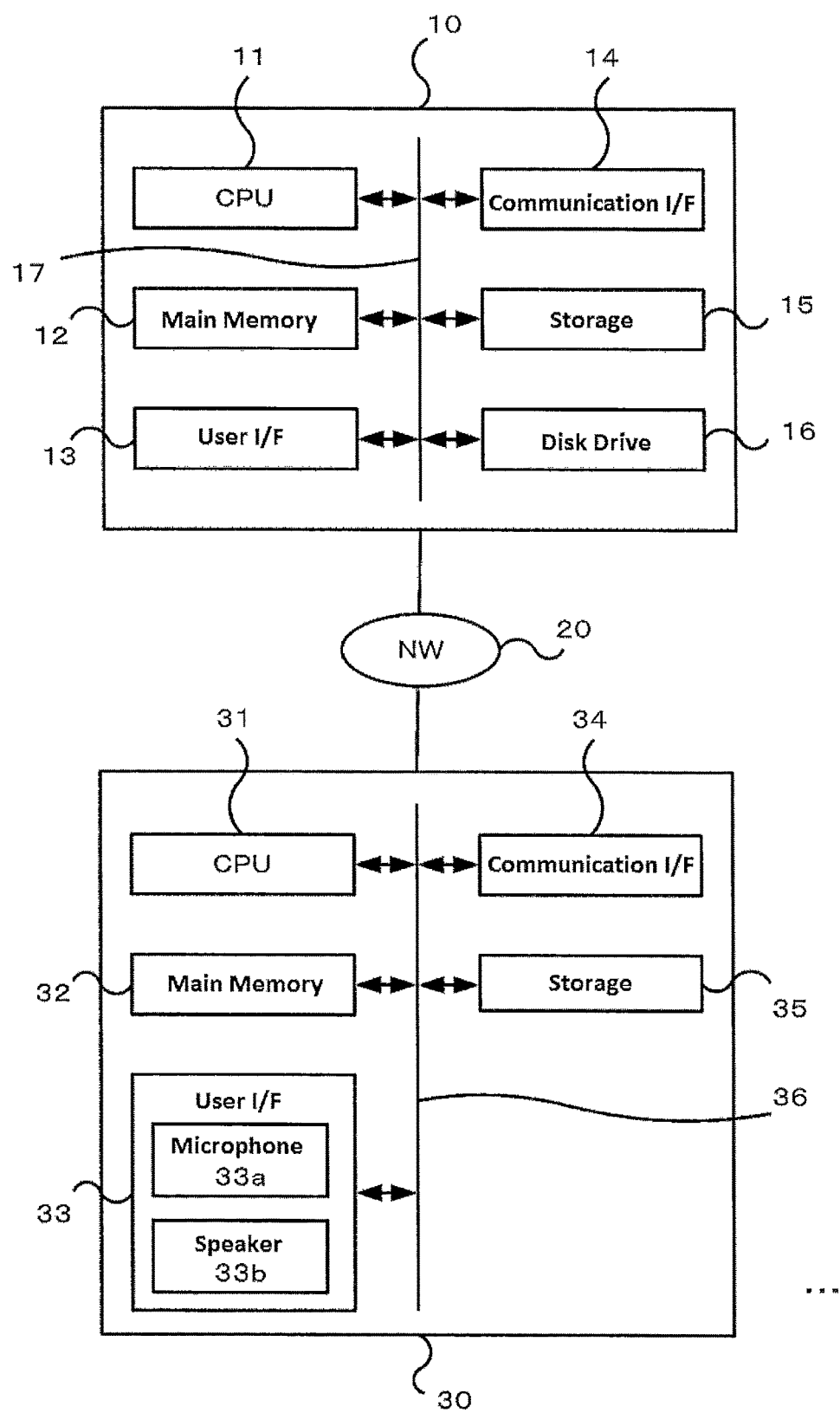
FIG. 1 is a block diagram schematically illustrating a system that includes a server 10 according to an embodiment of the invention.

FIG. 1 is a block diagram schematically illustrating a system that includes a server 10 according to an embodiment of the invention. Referring to FIG. 1, the server 10 according to the embodiment may be communicatively coupled to a plurality of terminal devices 30 via a communication network such as Internet, and the server 10 serves as a voice chat management device that manages voice chats performed between users who operate the plurality of terminal devices 30. The server 10 may provide, to users who operate the terminal devices 30, in addition to the voice chat service, various digital contents service including online games, electronic books, video contents, and music contents; a communication platform service (SNS platform) for implementing various user-to-user communication features such as text chat (mini mail), circle, avatar, diary, message board, and greeting, etc.; and various Internet services including electronic commerce services, etc.

As illustrated in FIG. 1, the server 10 according to the embodiment is configured as a common computer device and may include a central processing unit (CPU) (computer processor) 11, a main memory 12, a user interface (I/F) 13, a communication I/F 14, a storage 15, and a disk drive 16, and these components may be electrically connected to one another via a bus 17. The CPU 11 may load an operating system and various other programs into the main memory 12 from the storage 15, and may execute commands included in the loaded programs. The main memory 12 may be used to store a program to be executed by the CPU 11, and may be formed of, for example, a dynamic random access memory (DRAM) or the like. The server 10 according to an embodiment may be configured from computer devices that have the above-described hardware configurations.

The user I/F 13 may include, for example, an information input device such as a keyboard and a mouse for accepting an input from an operator, and an information output device such as a liquid crystal display for outputting calculation results of the CPU 11. The communication I/F 14 may be implemented as hardware, firmware, or communication software such as a transmission control protocol/Internet protocol (TCP/IP) driver or a point-to-point protocol (PPP) driver, or a combination thereof, and may be configured to be able to communicate with the terminals 30 via the communication network 20.

The storage 15 may be formed of, for example, a magnetic disk drive and store various programs such as a control program for controlling the provision of various services. The storage 15 may also store various data used in the provision of various services. The various data that may be stored in the storage 15 may also be stored on a database server communicatively connected to the server 10 and physically separate from the server 10. The disk drive 16 may read data stored in storage medium such as a compact disc read only memory (CD-ROM), digital versatile disc read only memory (DVD-ROM), or DVD Recordable (DVD-R) disc, or write data to such a storage medium.

In an embodiment, the server 10 may function as a web server for managing a web site including a plurality of hierarchical web pages and may provide the terminal device 30 with various above-mentioned Internet services through the web site. The storage 15 may also store the HTML data corresponding to the web page. Additionally, the HTML data may include programs written in script languages such as JavaScript™.

In an embodiment, the server 10 may provide various Internet services to the terminal device 30 through applications executed on execution environments other than a web browser on the terminal device 30. The storage 15 may also store such applications. The application programs may be created in, for example, programing languages such as Objective-C™ and Java™ and contain various image data. The application stored on the storage 15 may be delivered to the terminal 30 in response to a delivery request. The terminal 30 may download such applications from a server (a server providing application markets) other than the server 10.

Thus, the server 10 may manage the web site for providing various services and deliver web pages (HTML data) constituting the web site in response to a request from the terminal device 30, thereby providing various services to a user of the terminal device 30. Also, the server 10 can provide various services based on communication with an application performed on the terminal device 30 in place of, or in addition to, such web-page (web browser)-based services. The server 10 can transmit and receive various data (including data necessary to display a screen) to/from the terminal device 30 in order to provide services in any manner. The server 10 can store various types of data that are required to provide services. The server 10 may store such data for each piece of identification information (for example, user ID) that identifies each user and thereby can manage statuses (for example, (e.g., progress state of the game) of services provided to each user. Briefly, the server 10 may also include a function to authenticate a user at start of the service and perform charging process in accordance with provision of the service.

The terminal 30 according to an embodiment may be any information processing device that may display on a web browser a web page of a web site provided by the server 10 and include an executing environment for executing applications. As an example of such information processing device may include personal computers, smartphones, tablet terminals, wearable devices, and game-dedicated terminals.

As illustrated in FIG. 1, the terminal 30 may be configured as a typical computer device that includes a central processing unit (CPU) (computer processor) 31, a main memory 32, a user interface (I/F) 33, a communication I/F 34, and storage 35, and these components may be electrically interconnected via a bus 36.

The CPU 31 may load an operating system and various other programs into the main memory 32 from the storage 35, and may execute commands included in the loaded programs. The main memory 32 may be used to store a program to be executed by the CPU 31, and may be formed of, for example, a dynamic random access memory (DRAM) or the like.

The user I/F 33 may include, for example, an information input device such as a touch panel, a keyboard, a button, and a mouse for accepting an input from a user, and an information output device such as a liquid crystal display for outputting calculation results of the CPU 31. The user I/F 33 may include a typical microphone 33a (an audio input unit) into which voice/sound is input and the input voice/sound is converted to an electric signal, and a typical speaker (an audio output unit) 33b that converts the electric signal to voice/sound and outputs it. The communication I/F 34 may be implemented as hardware, firmware, or communication software such as a transmission control protocol/Internet protocol (TCP/IP) driver or a point-to-point protocol (PPP) driver, or a combination thereof, and may be configured to be able to communicate with the server 10 via the communication network 20.

The storage 35 may comprise, for example, a magnetic disk drive or a flash memory and store various programs such as an operating system. The storage 35 may also store various applications received from the serve 10 and the like.

The terminal 30 may include, for example, a web browser for interpreting an HTML file (HTML data) and rendering a screen; this web browser may enable the terminal 30 to interpret the HTML data fetched from the server 10 and render web pages corresponding to the received HTML data. A plug-in software that can execute files of various formats associated with the HTML data may be embedded in the web browser of the terminal 30.

When a user of the terminal device 30 receives various services provided by the server 10, for example, animation or an operation icon designated by HTML data or applications may be displayed on a screen of the terminal device 30. A user can input various instructions via a touch panel or the like of the terminal 30. The instruction entered by the user may be transmitted to the server 10 through the web browser or a function of an execution environment such as NgCore™ on the terminal 30.

Figure 2:
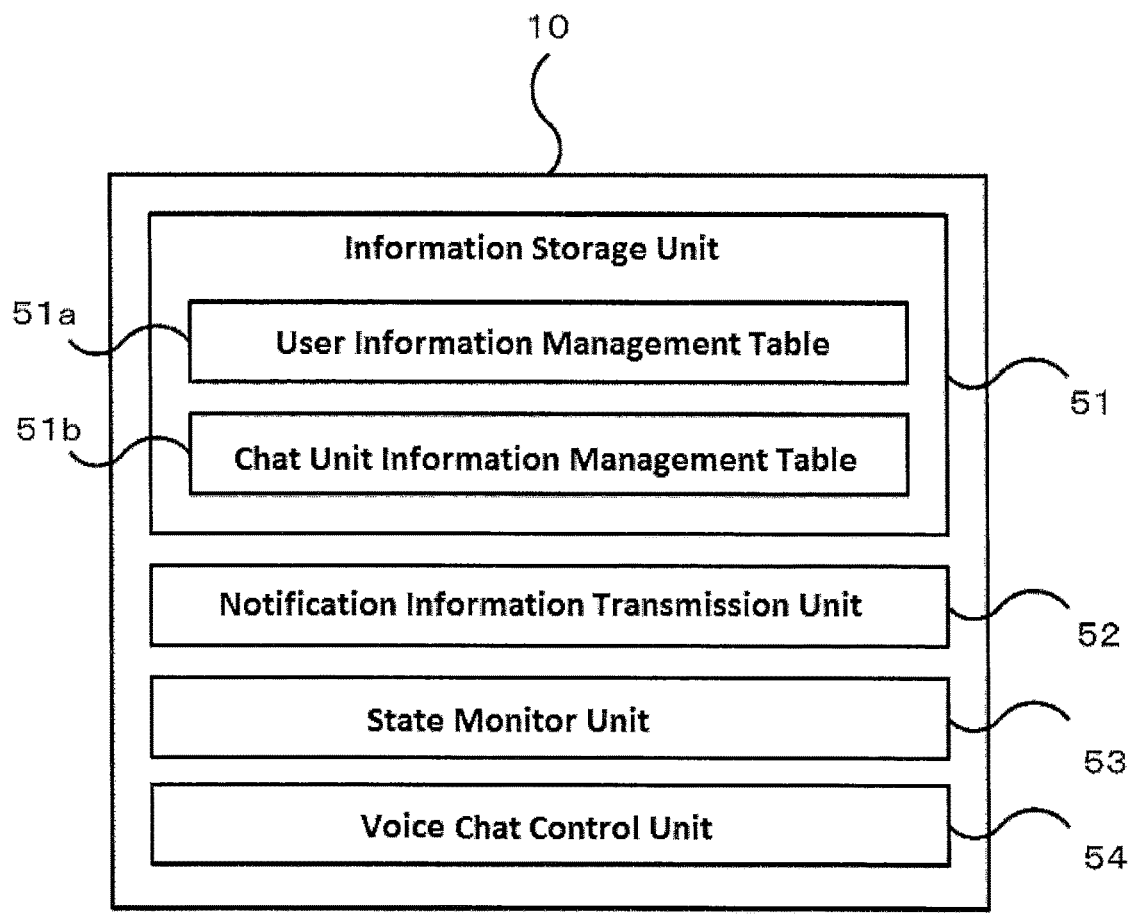
FIG. 2 is a block diagram illustrating the functionalities of the server 10 according to an embodiment.

Next, operations of the above-described server 10 according to an embodiment will be now described. The server 10 according to the embodiment may include the above-described features to provide various Internet services but hereunder a feature to manage voice chat will be mainly described. FIG. 2 is a block diagram illustrating the functionality of the server 10 according to an embodiment. Referring to FIG. 2, the server 10 may include an information storage unit 51 that store various types of information, and a notification information transmission unit 52 that transmits predetermined notification information to a terminal device 30 of an invited user (a second user) who is invited to a voice chat in response to receiving a voice chat initiation request to voice-chat with the invited user from a terminal device 30 of a requesting user (a first user). The server 10 may further include a state monitor unit 53 that monitors whether the requesting user and the invited user are in an available state in which they are able to perform a voice chat, and a voice chat control unit 54 that allows a voice chat communication between the terminal device 30 of the requesting user and the terminal device 30 of the invited user when the requesting user and the invited user are in the available state. These functionalities can be realized by cooperatively operating hardware such as the CPU 11 and the main memory 12 of the server 10 and software such as various programs stored in the storage 15 and the like. For example, instructions included in one or more computer programs corresponding to the above-described functionalities respectively are executed by the CPU 11 of the server 10 to realize the above-described functionalities.

The information storage unit 51 may be realized by means of storage 15 and the like of the server 10. The information storage unit 51 may include a user information management table 51a that manages user information concerning users, and a chat unit information management table 51b that manages chat-unit information concerning a chat unit which is a unit of voice chat performed between users. FIG. 3 is a diagram showing an example of information managed by the user information management table 51a according to an embodiment. Referring to FIG. 3, the user information management table 51a manages, in association with a "user ID" that identifies an individual user, "basic information" of the user (that may include, for instance, a nickname, gender, age, an image of the user, and the like), "friend information" concerning friends of the user (for instance, a friend can be made when one user accepts a friend request from other user), "audio stamp information" concerning audio stamps which the user have, and "login information" that indicates a login state (online state) of the user in the voice chat service, and the like.

The "audio stamp" mentioned above will be now described. The audio stamp is an audio file that can be used in the voice chat service according to one embodiment and can be played (audio-output) on the terminal devices 30 of individual users. The audio stamp may be configured as, for example, an audio file that has a file format of WAV, AIFF, or the like. In one embodiment, the audio stamps which the user possesses may be stored in the terminal device 30 of the user and redundantly in the server 10 (for instance, the storage 35). The audio stamps stored in the terminal device 30 and the audio stamps stored in the server 10 may be synchronized automatically or in response to a user's operation. Users may obtain audio stamps by purchasing or receiving from other users as gifts. Moreover, in one embodiment, users themselves may create (record) audio stamps that can be used in the voice chat service. The "audio stamp information" in the above-mentioned user information management table 51a may include information such as identification information (including file names) that identify individual audio stamps (audio files), icons, names, and descriptions of the audio stamps.

FIG. 4 illustrates an example of information managed in the chat unit information management table 51b according to one embodiment. Referring to FIG. 4, the chat unit information management table 51b manages, in association with a "chat unit ID" that identifies each chat unit, "member information" that indicates member users of the chat unit, and the like. The "chat unit" in one embodiment is a unit of voice chats performed among users as described above, and may also be referred to as a chat room, a chat group or the like. The "member information" may include a "user ID" of each member user who belongs to the chat unit, an "availability flag" that indicates whether each user is in the available state to perform voice chat in the chat unit or not. In one embodiment, members in the chat unit may include a user who created the chat unit (who newly started the voice chat), a user(s) who have been invited to the chat unit by the user who created the chat unit, and a user(s) who have been invited from the invited user(s).

The state monitor unit 53 in one embodiment may monitor whether the requesting user and invited user(s) (members of a chat unit) are in the available state in which they can perform a voice chat or not as described above. More specifically, monitoring of a user may be performed by updating the "availability flag" in the "member information" managed in the above-mentioned chat unit information management table 51b based on various types of data transmitted from the terminal device 30 when the user operates the terminal device. This will be further descried later.

As described above, the voice chat control unit 54 in one embodiment allows a voice chat communication between the terminal device 30 of the requesting user and the terminal device 30 of the invited user when the requesting user and the invited user are in the available state. In the case where the number of users, which are members of a chat unit, is three or more, a voice chat communication is allowed among the terminal devices of the users when two or more users are in the available state. More specifically, the voice chat communication is realized by transmitting, to other terminal device(s) 30, audio data of voice/sound that is input through the microphone 33a of each terminal device 30. In this case, the server 10 may receive audio data from individual terminal devices 30 and transfer the audio data to other terminal devices 30, or audio data from individual terminal devices 30 may be directly transmitted to other terminal devices 30. Alternatively, audio data from individual terminal devices 30 may be transmitted to other terminal devices 30 via any computer other than the server 10. In other words, one or more terminal device 30 (which include a terminal device 30 that performs a voice chat communication and a terminal device 30 that does not perform a voice chat communication) or other device(s) may have a part or all of the functions of the voice chat control unit 54 of the server 10. Transmission of audio data to a terminal device 30 may be performed by using, for example, streaming.

Figure 5:
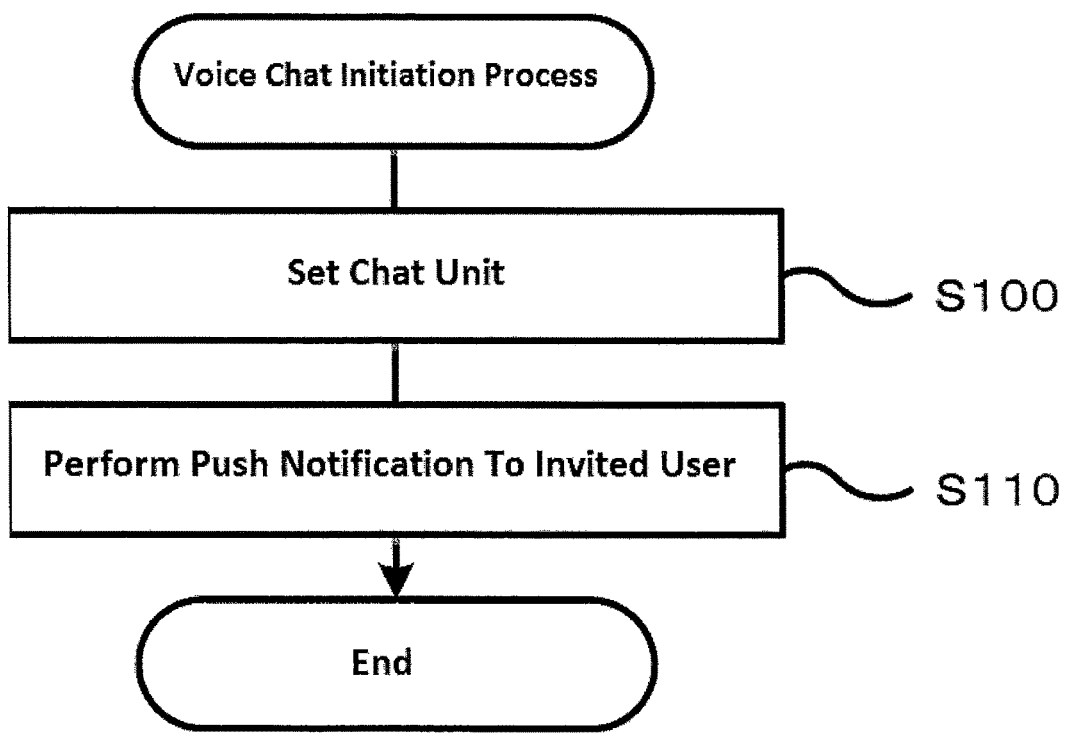
FIG. 5 is a flow diagram showing an example of a voice chat initiation process according to an embodiment.

Next, operation of the server 10 according to an embodiment will be described. FIG. 5 is a flow diagram showing an example of a voice chat initiation process performed by the server 10 when a user of a terminal device 30 newly starts a voice chat. The voice chat initiation process may be performed when a voice chat initiation request is received from the user of the terminal device 30. In one embodiment, the voice chat initiation request by a user may be performed via a voice chat service screen 70 displayed on the terminal device 30. The voice chat service screen 70 according to one embodiment will be now described.

Figure 6:
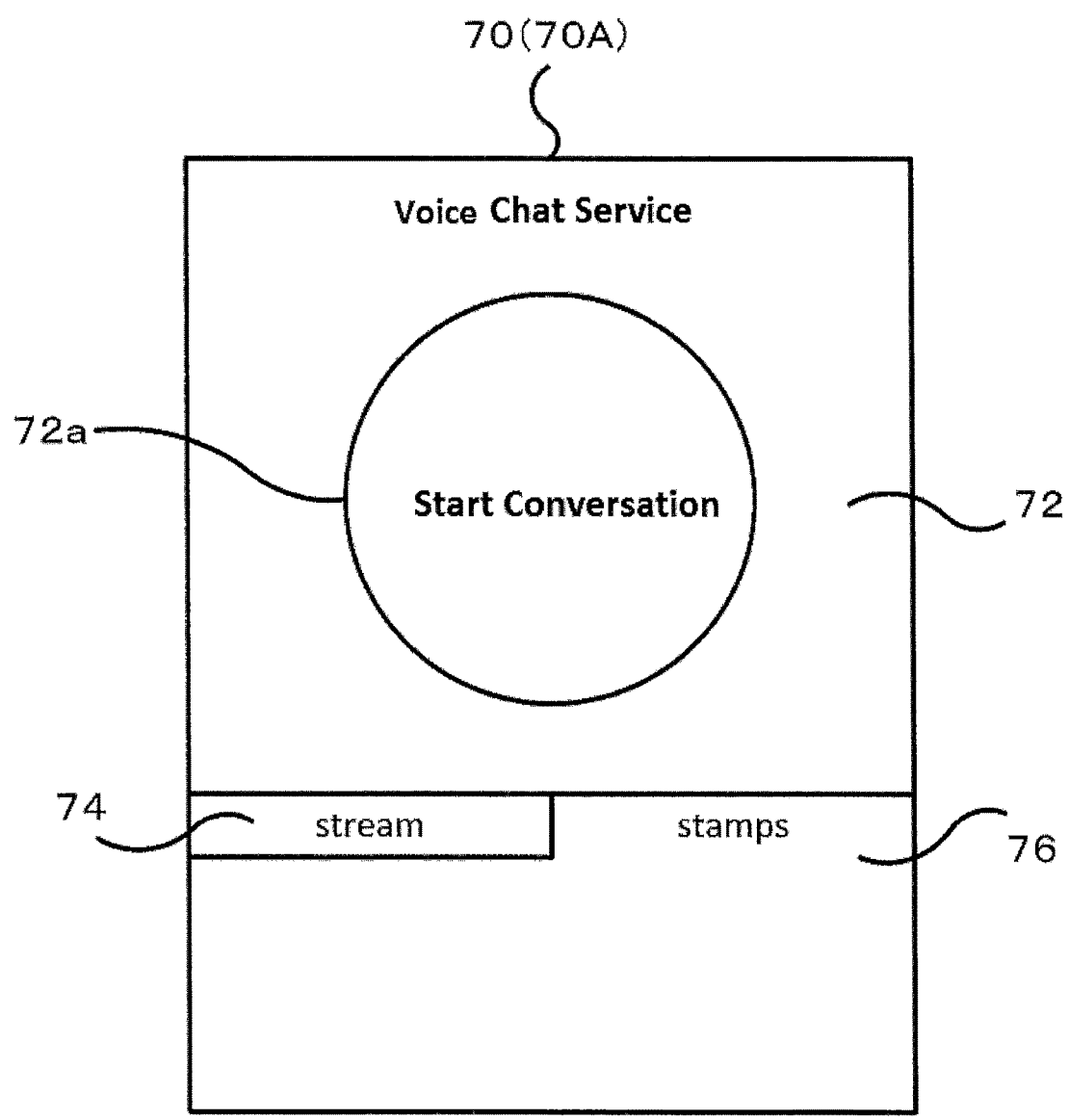
FIG. 6 illustrates an example of an initial screen 70A of a voice chat service screen 70 according to an embodiment.

The voice chat service screen 70 is a screen shown, for example, when an application for the voice chat service is running on a terminal device 30. The screen is for using the voice chat service provided by the server 10. FIG. 6 illustrates an example of an initial screen 70A of the voice chat service screen 70. Referring to FIG. 6, the voice chat service screen 70 may include a main area 72 situated in an upper area of the screen, and a stream area 74 that is situated in a lower left area of the screen and informs a user various information concerning the voice chat service, and a stamp area 76 that is situated in a lower right area of the screen and shows information concerning audio stamp(s). In the main area 72, various types of information may be displayed depending on different situations of use of the voice chat service. The stream area 74 and the stamp area 76 are tabbed areas where an area to be shown can be switched by selecting the tab as illustrated in FIG. 6. On the initial screen 70A illustrated in FIG. 6, a start button 72a on which "Start Conversation" is denoted may be provided in the main area 72. The start button 72a is a button for a user to instruct to start a new voice chat (create a chat unit). The main area 72 of the initial screen 70A may be configured to show a history of voice chats (chat units) which have been performed.

Figure 7:
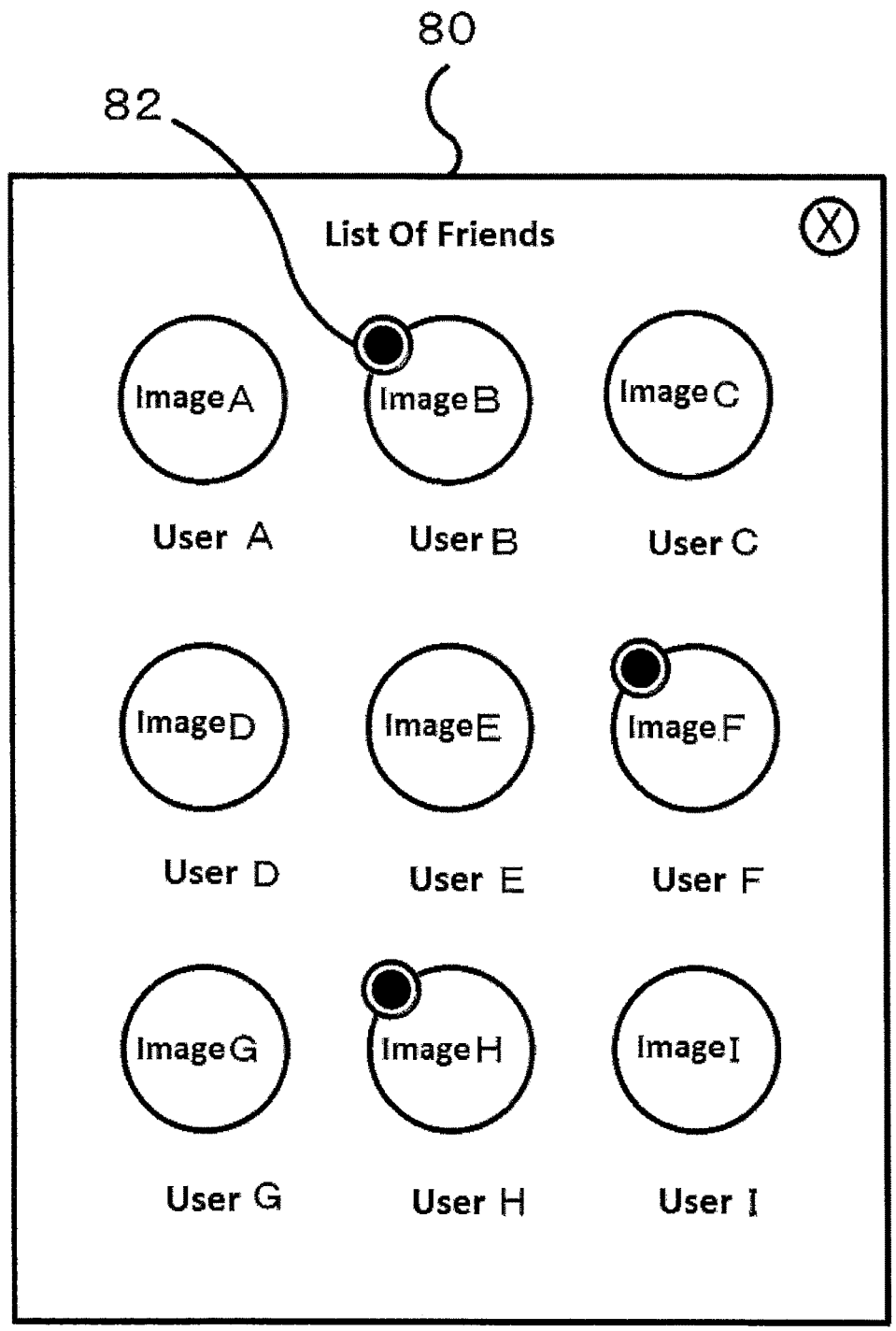
FIG. 7 illustrates an example of a friend list screen 80 according to an embodiment.

When a user selects the start button 72a, a friend list screen 80 illustrated in FIG. 7 may be overlaid on the voice chat service screen 70 (the initial screen 70A). Referring to FIG. 7, the friend list screen 80 may show a list of information concerning friends of the user of the terminal device 30 (for example, images of users, nicknames and the like). Friends of the user may be managed in the "friend information" in the user information management table 51a and the information displayed on the friend list screen 80 may be transmitted from the server 10 to the terminal device 30 in response to a request from the terminal device 30. In one embodiment, the user is able to check a login state of the friends on the list with a login indicator 82 that is shown on the upper left corner of the image of a user who is logged in the voice chat service (such information may be managed in the "login state" of the user information management table 51a).

Figure 8:
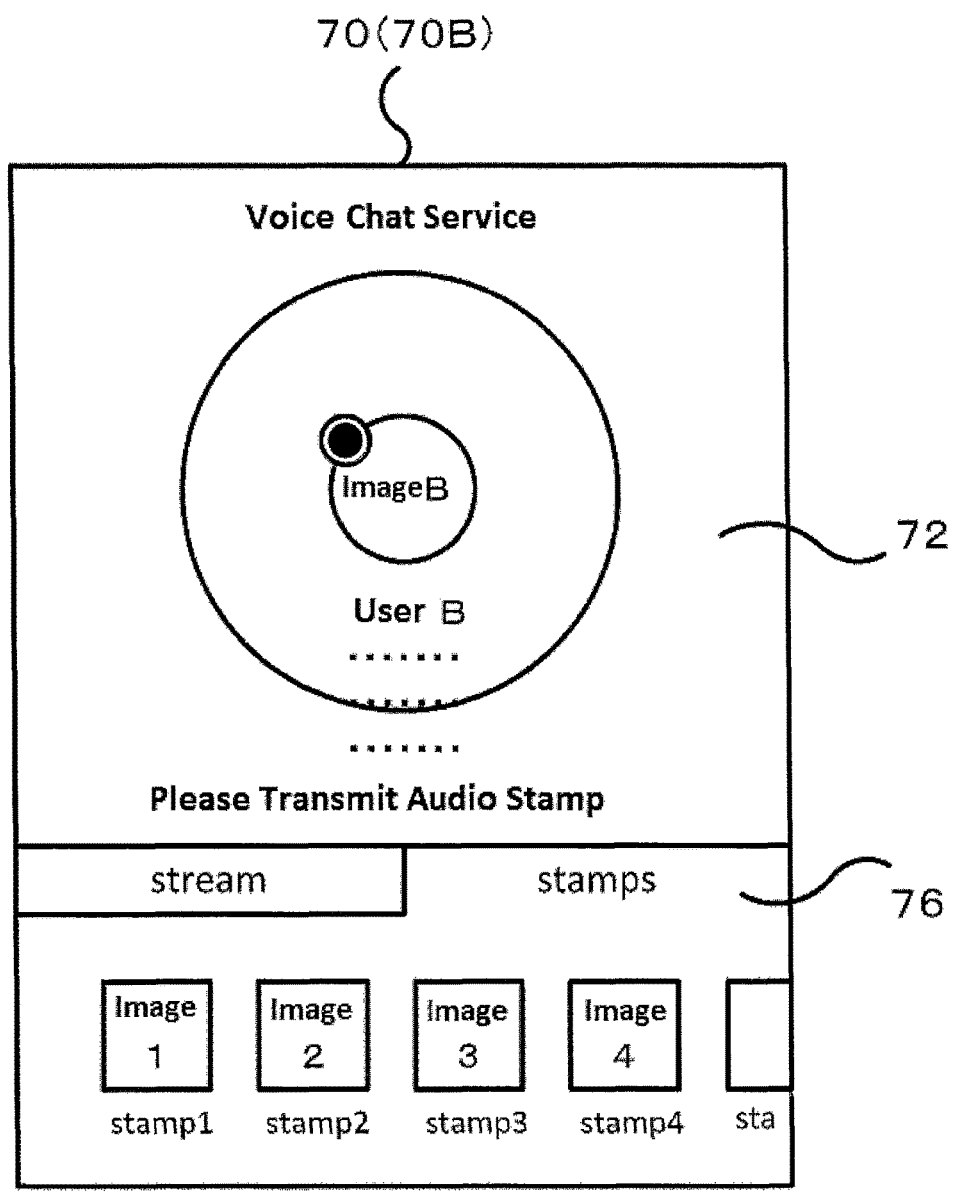
FIG. 8 illustrates an example of a friend details screen 70B of the voice chat service screen 70 according to an embodiment.

When the user selects a desired user(s) (friend(s)) to invite to the voice chat from among the friends listed on the friend list screen 80, the voice chat service screen 70 transitions to a friend details screen 70B illustrated in FIG. 8. On the friend details screen 70B, the main area 72 may show basic information about the selected user(s) (a user B in this example), and the stamp region 76 may show a list of information about audio stamps (for example, an icon image, name, description and the like) which the selected user has as shown in FIG. 8. The information about the audio stamps which the selected user has may be managed in the "audio stamp information" of the user information management table 51a.

In one embodiment, by selecting any one of the audio stamps in the list shown in stamp area 76 of the friend details screen 70B illustrated in FIG. 8, the user can make a request to start a voice chat with the selected user. More specifically, when the user selects any one of the audio stamps, a voice chat initiation request together with invited user information that identifies the selected user (an user to be invited to the voice chat) and audio stamp identification information that identifies the selected audio stamp may be transmitted from the terminal device 30 to the server 10.

When the voice chat initiation request is performed by selecting any of the audio stamps shown in the list in the stamp region 76, it may be configured to allow the user to check the sound/voice corresponding to the audio stamp (the contents of the audio file) before the user transmits the request. For example, when a user selects any of the audio stamps in the stamp region 76, an audio file corresponding to the selected audio stamp may be transmitted from the server 10 to the terminal device 30 and the terminal device 30 may play the received audio file. Subsequently the user may confirm the stamp (for example, by selecting a confirm button or the like) to perform the voice chat initiation request. Furthermore, the user of the terminal device 30 may be allowed to obtain a part or all of the audio stamps (audio files) which the selected user(s) has when the user performs a corresponding operation on the terminal device 30. In this case, the obtained audio stamp(s) may be downloaded in the terminal device 30 and stored in the storage 35 or the like.

Figure 9:
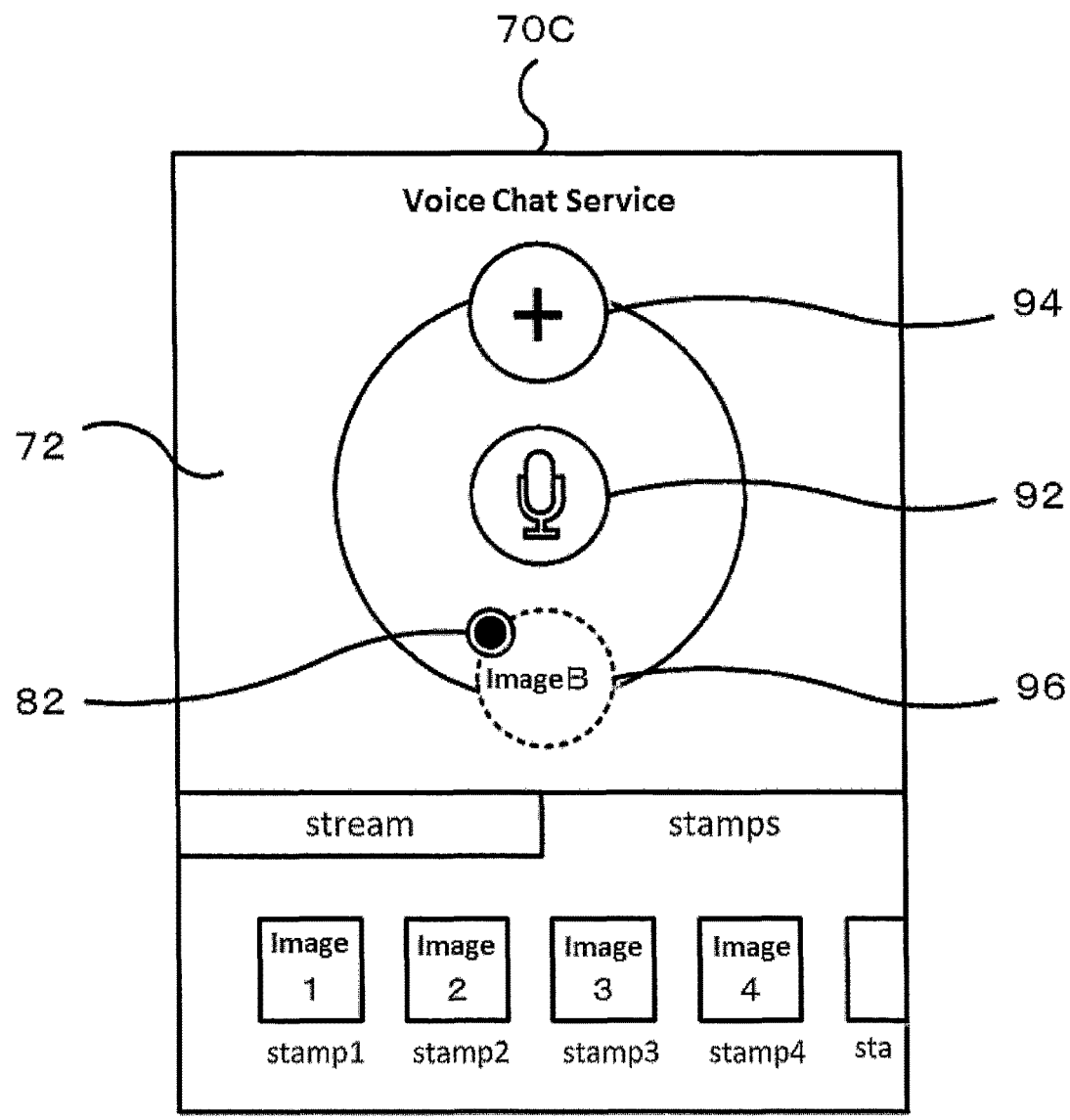
FIG. 9 illustrates an example of a voice chat screen 70C of the voice chat service screen 70 according to an embodiment.

Once the audio stamp is selected and the voice chat initiation request is made, the voice chat service screen 70 may transition to a voice chat screen 70C illustrated in FIG. 9. The voice chat screen 70C is a screen displayed on the terminal device 30 when a user actually performs a voice chat. Referring to FIG. 9, in the main area 72 of the screen, provided are a microphone icon 92 situated at the center, an invitation icon 94 for newly inviting other user(s) to the voice chat (the chat unit), and user icon(s) 96 that represents other member(s) of the chat unit (user(s) other than the user of the terminal device 30) respectively. The microphone icon 92 may be configured as an icon that has a so-called mute function to enable/disable the microphone 33a of the terminal device 30 when the user selects the icon. In one embodiment, the user icon 96 may be shown such that the user can recognize a login state of the user in the voice chat service and whether the user is in the available state where the user can perform the voice chat (the chat unit) or not (in other words, whether the user participate in the voice chat or not). For instance, in the embodiment illustrated in FIG. 9, the login state of the user can be recognized by the login indicator 82. Moreover, the appearance of the user icon 96 may indicate whether the user is in the available state to perform the voice chat (for instance, the user icon 96 of a user who is not in the available state may be grayed out).

In one embodiment, in the main area 72 of the voice chat screen 70C, information about a single chat unit among a plurality of chat units to which the user of the terminal device 30 belongs to may be displayed, and a user may be able to select a chat unit to be shown among the plurality of chat units by the user's operation (for instance, by flicking).

Referring again to the flow chart of FIG. 5, when the voice chat initiation request is received from the terminal device 30, the server 10 may firstly set a chat unit (step S100). This process may be performed by the state monitor unit 53 of the server 10. More specifically, a new record may be created in the chat unit information management table 51b, a unique value may be generated and set as the "chat unit ID," and information about the requesting user of the voice chat and the invited user(s) who has been invited to the voice chat may be set in the "member information." At this point, as for the requesting user, a value indicating that the user is in the available state (for instance, the value may be "1") may be set in the "availability flag" in the "member information" and as for the invited user, a value indicating that the user is not in the available state (for instance, the value may be "0") may be set in the "availability flag."

Subsequently, a push notification about invitation to the voice chat may be performed on the terminal device 30 of the invited user (step S110), and the voice chat initiation process is completed. This process may be performed by the notification information transmission unit 52 of the server 10. More specifically, notification information that notifies there is an invitation to the voice chat from the requesting user and the identification information of the audio stamp selected by the requesting user may be transmitted to the terminal device 30 of the invited user.

In one embodiment, when the voice chat initiation request is performed as described above, the notification information is transmitted to the invited user who has been invited to the voice chat. The voice chat communication between the terminal device 30 of the requesting user and the terminal device 30 of the invited user is enabled by the features of the above-described state monitor unit 53 and the voice chat control unit 54 when the requesting user and the invited user are in the available state where they are able to perform the voice chat. Operations before the voice chat communication is enabled after the notification information has transmitted to the invited user will be now described in detail.

Figure 10:
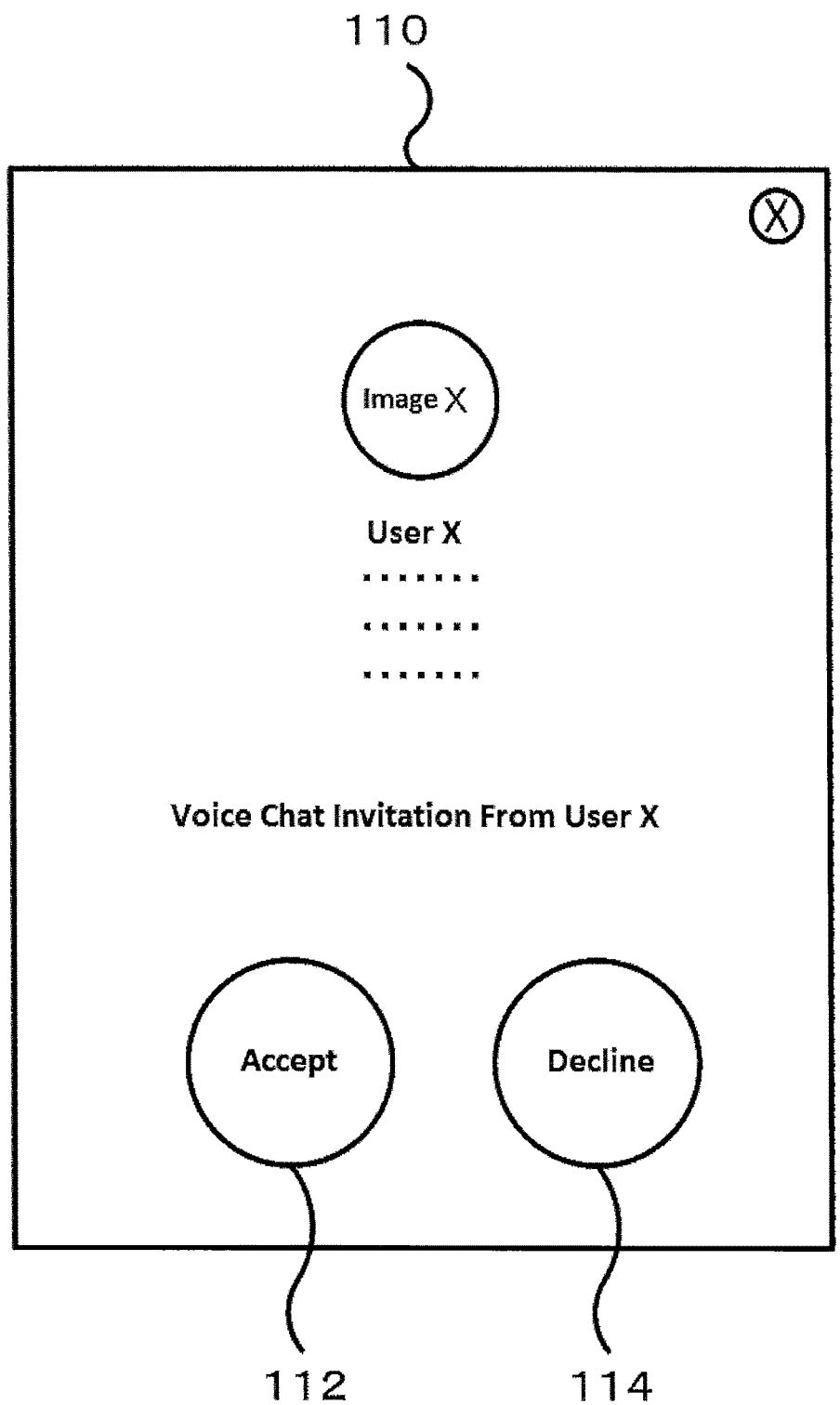
FIG. 10 illustrates an example of an invitation notification screen 110 according to an embodiment.

On the terminal device 30 that has received the push notification (the notification information and the audio stamp identification information) about the invitation to the voice chat from the server 10, an operation that corresponds to a state of the invited user at the time when he/she receives the push notification may be performed. For example, if the invited user is logged in the voice chat service (for instance, the application for the voice chat service is running) and the invited user is not performing a voice chat with other user(s) (a voice chat in other chat unit) at the time when the invited user receives the notification, an invitation notification screen 110 illustrated in FIG. 10 may be overlaid on the voice chat service screen 70. Referring to FIG. 10, the invitation notification screen 110 may show information about the requesting user of the voice chat (the user X in this example), and an accept button 112 for accepting the invitation to the voice chat and a decline button 114 for declining the invitation to the voice chat are provided on the screen. Operations to accept or decline will be described later.

Figure 11:
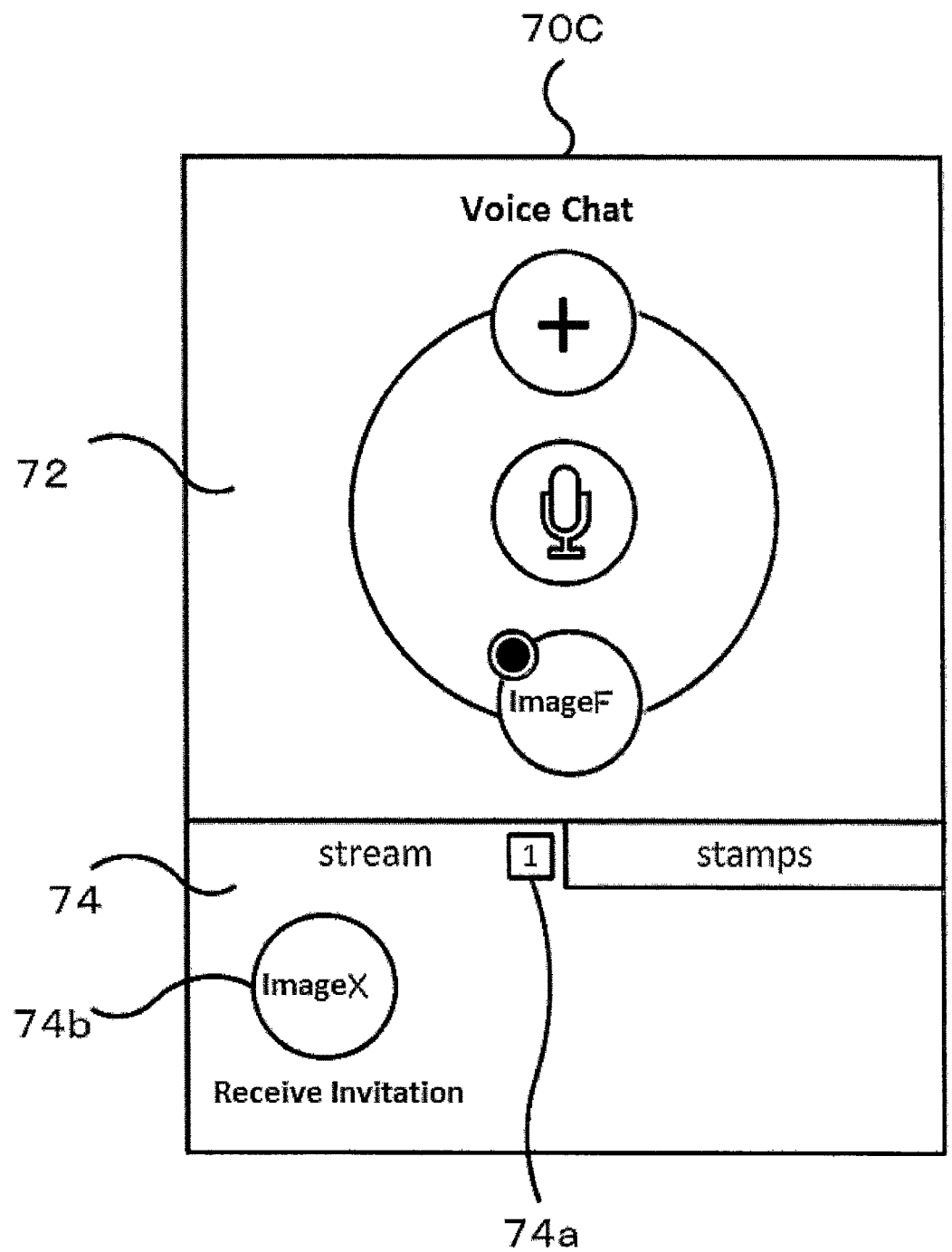
FIG. 11 illustrates an example of a voice chat screen 70C of the voice chat service screen 70 according to an embodiment.

Alternatively, if the invited user is logged in the voice chat service and is performing a voice chat with other user, for example, the stream area 74 of the voice chat service screen 70 (the voice chat screen 70C) may show that the invited user receives a push notification about the invitation of the voice chat as illustrated in FIG. 11. More specifically, in the stream area 74, the content (the number of notifications) of a newly-arrived notifications number area 74a that indicates the number of newly-arrived notifications may be updated and a user image 74b of the requesting user may be shown together with a text "Invitation received." When the invited user selects the user image 74b shown in the stream area 74, the above-described invitation notification screen 110 may be overlaid thereon.

Figure 12:
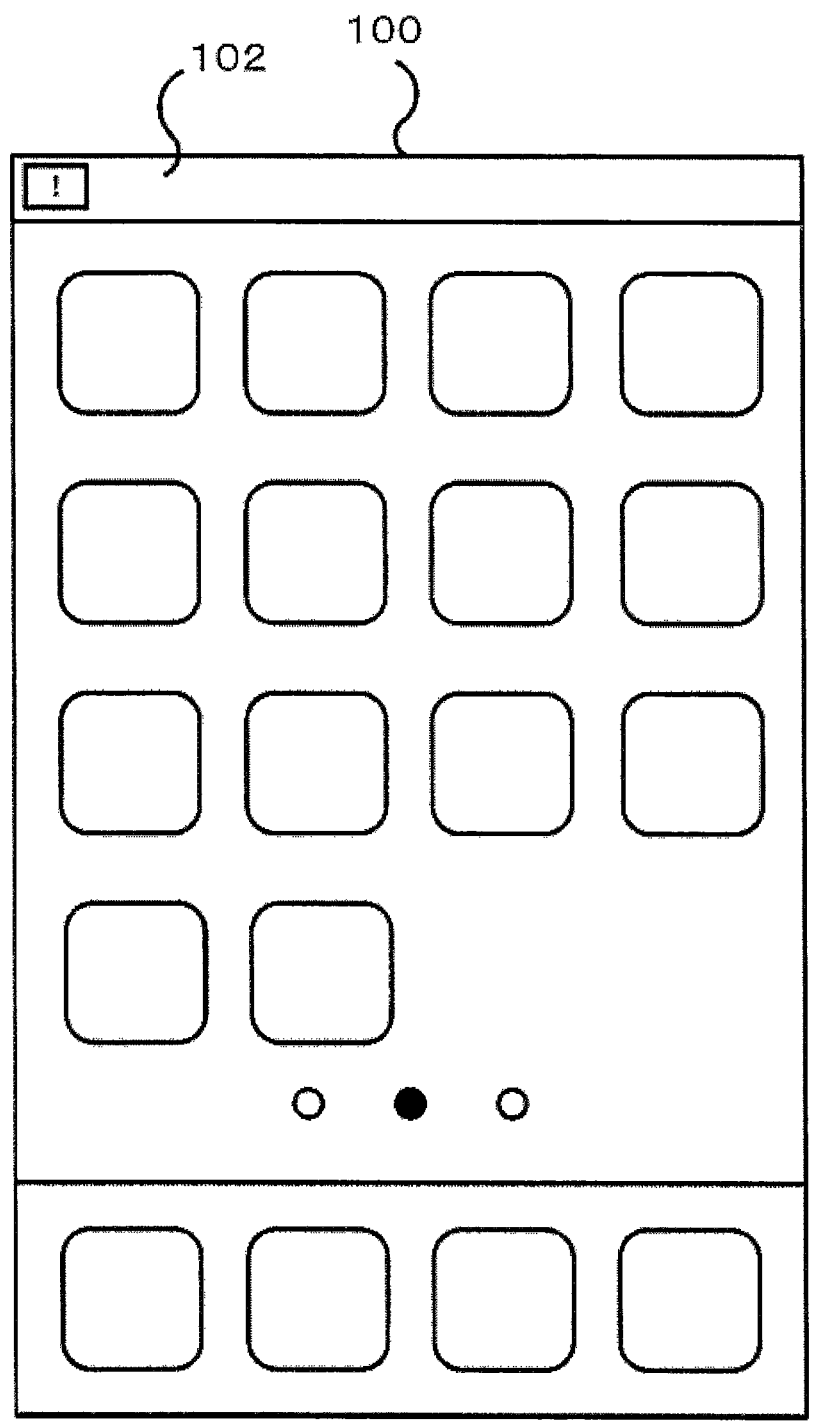
FIG. 12 illustrates an example of a home screen 100 according to an embodiment.

Alternatively, if the invited user is not logged in the voice chat service (for example, an application for the voice chat service is not running on the terminal device), a notification may be displayed by the operating system of the terminal device 30. FIG. 12 illustrates an example of a home screen 100 (a screen generated by a function of the operating system) of the terminal device 30 on which the notification performed by the function of the operating system is displayed. Referring to FIG. 12, an icon indicating that there is a push notification to a user may be displayed in a notification information display area 102 situated at the upper end of the home screen 100. When the user selects the push notification corresponding to the icon, for example, the application for the voice chat service may be run (activated) and the user may be logged into the voice chat service. Subsequently the voice chat service screen 70 on which the invitation notification screen 110 is overlaid is shown.

In one embodiment, at the timing when the above-mentioned invitation notification screen 110 is displayed on the terminal device 30 of the invited user, the audio stamp (the audio file) that has been received together with the notification information may be played. More specifically, the terminal device 30 may identify the audio stamp based on the received audio stamp identification information from among the plurality of audio stamps (audio files) stored in the storage 35 and then play the audio stamp. Playing of an audio stamp (an audio file) may be performed by using, for example, a function of the application for the voice chat service, a function of other application, or a function of the operating system. Here, the timing at which the audio stamp is played may not be limited to when the invitation notification screen 110 is displayed. For example, the audio stamp may be played before the invitation notification screen 110 is displayed (for example, when a notification indicating that the push notification is received is shown in the stream area 74) while the invited user is voice-chatting with other user(s). Alternatively when the invited user is not logged in the voice chat service, the audio stamp may be played when the notification performed by the function of the operating system is displayed.

In this way, the invited user is able to accept or decline the invitation to the voice chat from the requesting user via the invitation notification screen 110 displayed on the terminal device 30. When the invited user selects the accept button 112 on the invitation notification screen 110, acceptance information indicating that the invited user has accepted the invitation to the voice chat may be transmitted to the server 10 from the terminal device 30. When the server 10 receives the acceptance information from the terminal device 30, the state monitor unit 53 of the server 10 may update the chat unit information management table 51b such that the invited user becomes in the available state in which the invited user can perform the voice chat (the chat unit). More specifically, the "availability flag" of the invited user in the "member information" of the corresponding chat unit is updated to a value that indicates that the user is in the available state.

When the invited user selects the decline button 114 on the invitation notification screen 110, decline information indicating that the invited user has declined the invitation to the voice chat may be transmitted to the server 10 from the terminal device 30. When the server 10 receives the decline information from the terminal device 30, the state monitor unit 53 of the server 10 may update the chat unit information management table 51b such that the invited user is removed from the members of the chat unit. More specifically, information about the invited user may be deleted from the "member information" of the corresponding chat unit. In this case, the notification information transmission unit 52 of the server 10 may transmit, to the terminal device 30 of the requesting user, a push notification about the declination of the invitation by the invited user.

Figure 13:
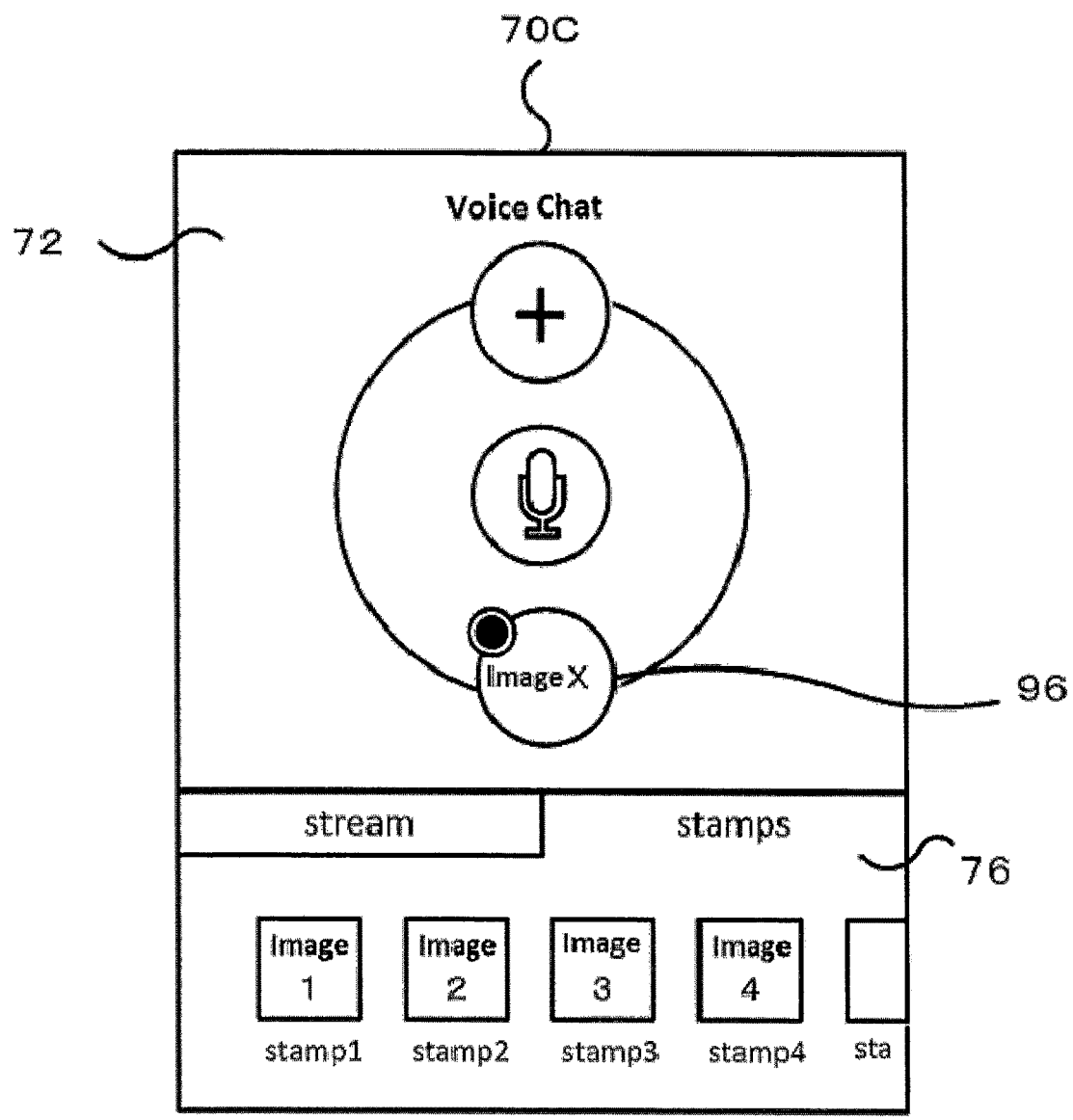
FIG. 13 illustrates an example of a voice chat screen 70C of the voice chat service screen 70 according to an embodiment.

When the invited user accepts the invitation to the voice chat and is in the available state where the invited user is able to perform the voice chat (the chat unit) while the requesting user is in the available state, which means that both the requesting user and the invited user are in the available state, a voice chat communication between the terminal deice 30 of the requesting user and the terminal device 30 of the invited user is allowed by the above-described function of the voice chat control unit 54 of the server 10. FIG. 13 illustrates an example of the voice chat screen 70C displayed on the terminal device 30 of the invited user at this point. Referring to FIG. 13, the user icon 96 corresponding to the requesting user (the user X) of the voice chat may be shown in the main area 72. Moreover, a list of information about the audio stamps which the requesting user possesses may be shown in the stamp area 76, here the requesting user is a member of the voice chat (the chat unit). On the terminal device 30 of the requesting user, the voice chat screen 70C same as the voice chat screen 70C of FIG. 13 may be displayed.

When the voice chat communication between the terminal device 30 of the requesting user and the terminal device 30 of the invited user is enabled in the above-described manner, the requesting user and the invited user are able to start the voice chat. More specifically, audio data of sound/voice input through the microphone 33a of a terminal device 30 of a user may be transmitted to terminal device(s) 30 of other user(s) and the audio is output from the speaker 33b. In one embodiment, each user may be able to play audio stamps stored in the terminal device(s) of other user(s) during the voice chat (hereunder may also be referred to as "transmit an audio stamp"). More specifically, when any of audio stamps in the list shown in the stamp area 76 of the voice chat screen 70C is selected, for example, the identification information of the selected audio stamp may be transmitted to a terminal device 30 of other user via the server 10 and the audio stamp (the audio file) identified with the audio stamp identification information may be played on the terminal device 30 of the other user. At this point, in the main area 72 of the voice chat screen 70C displayed on the terminal device 30 of the other user who has played the audio stamp, information about the played stamp (for example, an icon image) may be shown in the user icon 96 of the user who has transmitted the audio stamp.

Figure 14:
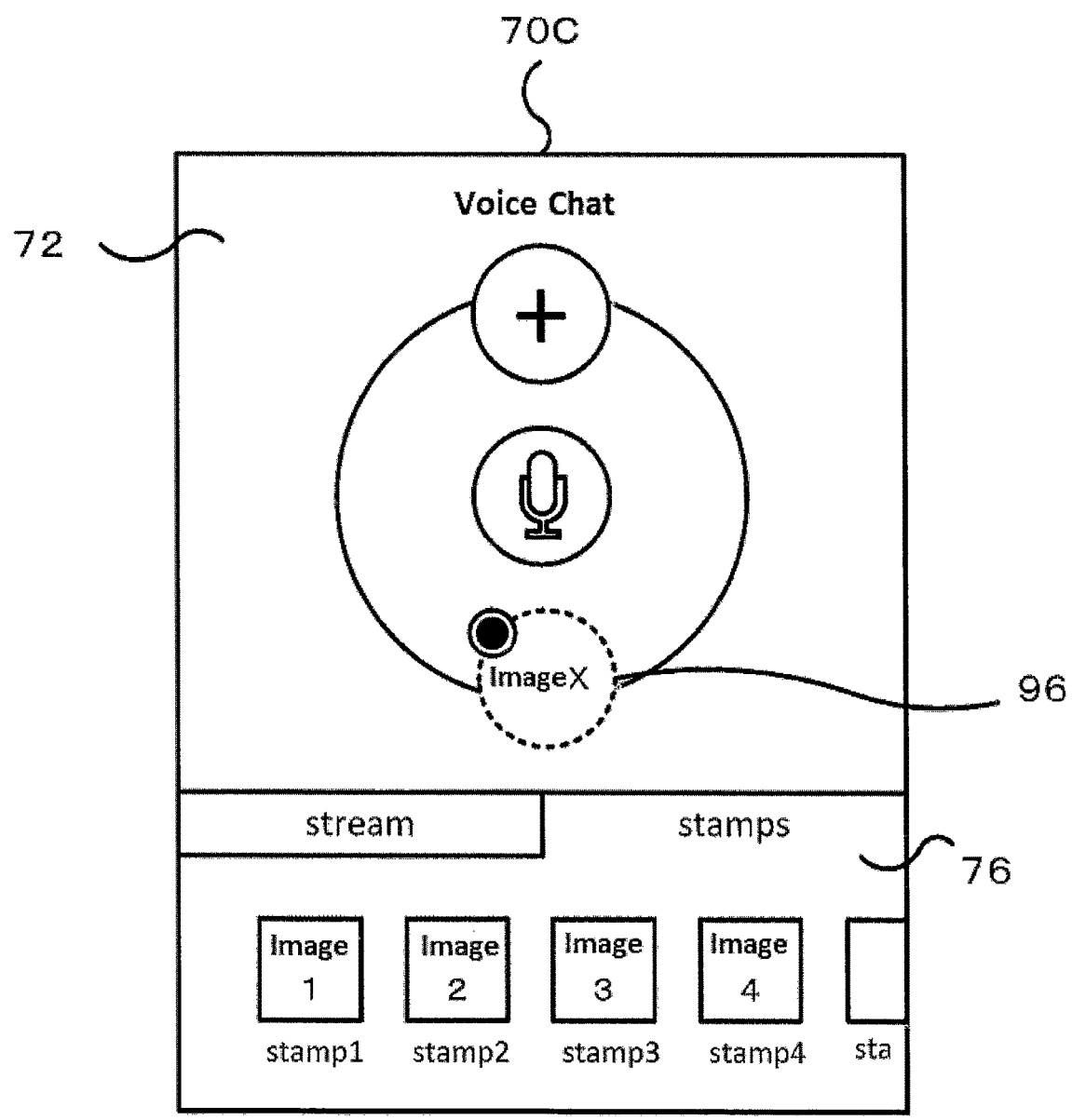
FIG. 14 illustrates an example of the voice chat screen 70C of the voice chat service screen 70 according to an embodiment.

Whereas when the invited user accepts the invitation to the voice chat and is in the available state where the invited user is able to perform the voice chat but the requesting user is not in the available state, a voice chat communication between the terminal device 30 of the requesting user and the terminal device 30 of the invited user is not allowed. FIG. 14 illustrates an example of the voice chat screen 70C displayed on the terminal device 30 of the invited user at this point. Referring to FIG. 14, the user icon 96 corresponding to the requesting user (the user X) in the main area 72 may be shown in a manner in which the user is not in the available state (for example, the icon is grayed out). The case where the requesting user is not in the available state when the invited user accepts the invitation to the voice chat may include, for example, a case where the requesting user has logged off (the requesting user closed the application for the voice chat service) after he/she had made the voice chat initiation request, a case where the requesting user has started a voice chat with other user (a voice chat in a different chat unit) after he/she had made the voice chat initiation request, and the like.

In one embodiment, when the invited user accepts the invitation to the voice chat and is in the available state where the invited user is able to perform the voice chat but the requesting user is not in the available state, the notification information transmission unit 52 of the server 10 may transmit, to the terminal device 30 of the requesting user, a push notification indicating that the invited user has accepted the invitation. In the terminal device 30 of the requesting user who received the push notification, an operation according to a state of the requesting user when he/she received the push notification may be performed. For example, a notification may be made to notify that the user has received the push notification about the acceptance of the invitation by a function of the operating system, or the stream area 74 of the voice chat screen 70C may show the notification to notify that the user has received the push notification about the acceptance of the invitation.

Figure 15:
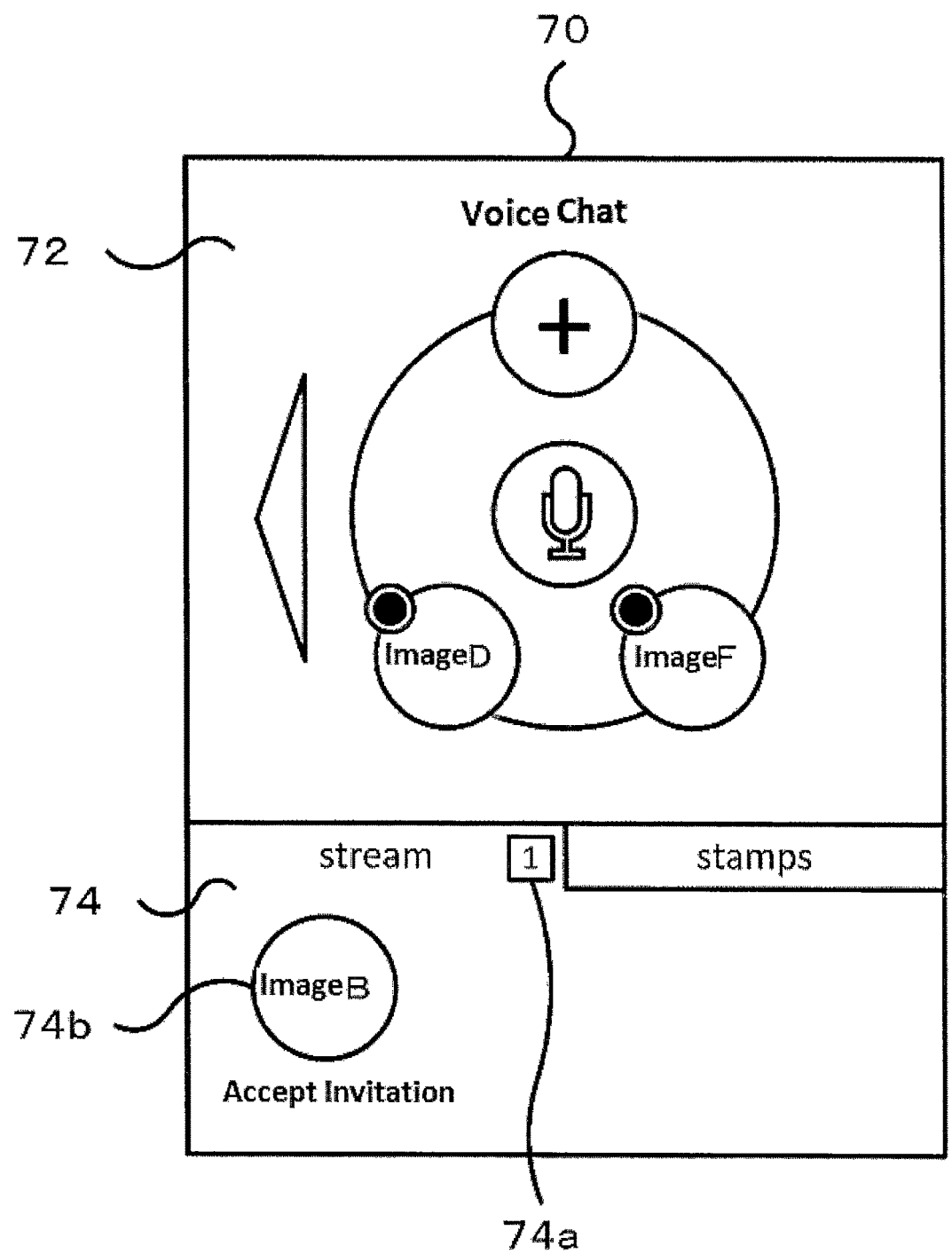
FIG. 15 illustrates an example of the voice chat screen 70C of the voice chat service screen 70 according to an embodiment.
Figure 16:
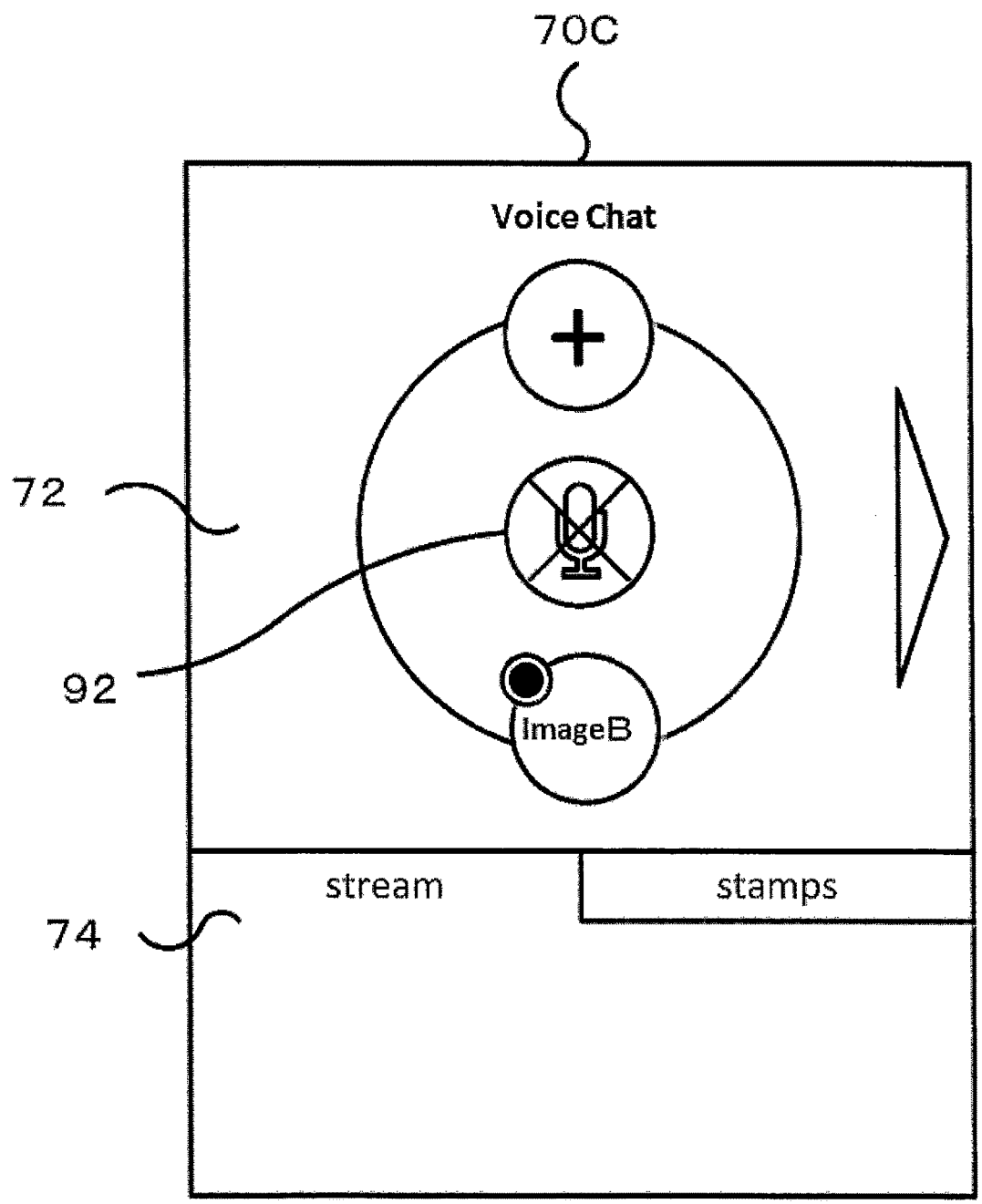
FIG. 16 illustrates an example of the voice chat screen 70C of the voice chat service screen 70 according to an embodiment.

FIG. 15 illustrates an example of the voice chat screen 70C displayed on the terminal device 30 of the requesting user when the requesting user is performing a voice chat with other user(s) (a user D and a user F in this example) at the time when the invited user accepts the invitation to the voice chat. Referring to FIG. 15, the stream area 74 of the voice chat screen 70C may indicate that a push notification about the acceptance of the invitation is received. More specifically, the content (the number of notifications) of the newly received notifications number area 74*a* may be updated and the user image 74*b* of the invited user (the user B) who has accepted the invitation may be shown together with a text "Invitation accepted" Subsequently when the requesting user selects the user image 74*b* in the stream area 74 (or flicks the main area 72), the main area 72 may be switched to display information about the voice chat (the chat unit) with the invited user (the user B) as illustrated in FIG. 16. At this point, the voice chat between the requesting user and the invited user is not enabled yet but the requesting user continues to voice-chat with the other users (the user D and the user F) so that the user icon 92 in the main area 72 is shown in a manner that indicates the disable state (a mute state) of the microphone 33*a* (a disabled state indication).

When the requesting user selects the microphone icon 92 in the disabled state indication, the microphone icon 92 may be then shown in a manner that indicates an enabled state (non-mute state) of the microphone 33*a* (an enabled state indication), and the requesting user may be switched to the available state where the requesting user is able to chat with the invited user (the user B). The state monitor unit 53 of the server 10 may update the chat unit information management table 51*b* such that the requesting user becomes in the available state where the requesting user is able to perform the voice chat (the chat unit) with the invited user (the user B). More specifically, the "availability flag" of the requesting user in the "member information" of the corresponding chat unit is updated to a value that indicates that the requesting user is in the available state. Moreover, the voice chat with other users (the user D and the user F) performed by the requesting user may be no longer available so that the "availability flag" of the requesting user in the "member information" of the corresponding chat unit is updated to a value that indicates that the requesting user is not in the available state. When the invited user remains in the available state, both the requesting user and the invited user become in the available state so that the voice chat between the terminal device 30 of the requesting user and the terminal device 30 of the invited user is enabled by the function of the voice chat control unit 54 of the server 10.

As described above, in one embodiment, a user of the terminal device 30 selects (switches) the chat unit to be enabled (in other words, the chat unit to perform a voice chat) by switching the chat unit displayed in the main area 72 of the voice chat screen 70C by flicking or the like to select the microphone icon 92 (to switch between the enabled state indication and the disabled state indication). In other words, the state monitor unit 53 of the server 10 updates the "availability flag" of the chat unit information management table 51*b* based on the data transmitted from the terminal device 30 such that the chat unit selected by the user by operating the terminal device 30 (the voice chat screen 70C) becomes available.

In one embodiment, after a new voice chat is started (a new chat unit is created), members of the chat unit may be able to invite a new user(s). In this case, an operation same as the above-described operation related to the invited user when a voice chat is newly started may be performed for the newly invited user. More specifically, when a user selects the above-mentioned invitation icon 94 situated in the main area 72 of the voice chat screen 70C, the friend list screen 80 illustrated in FIG. 7 may be overlaid thereon. Subsequently when the user selects a desired user(s) whom the user would like to newly invite from among the friends in the list, the screen is switched to the friend details screen 70B illustrated in FIG. 8. By selecting any of the audio stamps listed in the stamp area 76 of the friend details screen 70B, the user is able to perform an invitation request to invite the selected user(s) to the voice chat (the chat unit). The state monitor unit 53 of the server 10 that has received the invitation request from the terminal device 30 may update the "member information" of the chat unit information management table 51*b* such that the newly invited user(s) become a member(s) of the chat unit. The state monitor unit 53 may then perform a push notification about the invitation to the voice chat onto the terminal device(s) 30 of the newly invited user(s). The following operations may be same as those of the newly started voice chat described above. For example, when the newly invited user(s) accepts the invitation to the voice chat, the newly invited user(s) becomes in the available state where the user(s) is able to perform the voice chat.

In the above-described embodiment, an audio stamp is transmitted (an audio stamp which is played on the terminal device 30 of the invited user is selected) when the voice chat initiation request is performed. Alternatively, the voice chat initiation request may be performed only by selecting the invited user(s) without transmitting the audio stamp.

The server 10 according to the above-described embodiment may transmit the notification information to the terminal device 30 of the invited user (the second user) who is invited to a voice chat in response to the reception of the voice chat initiation request from the terminal device 30 of the requesting user (the first user). The server 10 may then monitor whether the requesting user and the invited user are in the available state where they are able to perform the voice chat. When they are in the available state, the server 10 enables the voice chat communication between the terminal device 30 of the requesting user and the terminal device 30 of the invited user. This means that once the requesting user performs the voice chat initiation request to the invited user, the requesting user is able to start the voice chat with the invited user when both the requesting user and the invited user become in the available state where they are able to perform the voice chat. In this way, it is possible to allow a user to start a voice chat with other user(s) more easily.

In the above-described embodiment, when the invited user accepts the invitation to the voice chat, the invited user becomes in the available state where the invited user can perform the voice chat (the chat unit). However, an event to make the invited user in the available state is not limited to this. For example, the invited user may be switched to the available state when the push notification information provided by the server 10 is displayed or when the invited user sees or confirms the notification information. Alternatively, the invited user may be switched to the available state whether there is an action or no action of the invited user in response to the push notification information.

Moreover, when a new voice chat is initiated, a voice chat communication between the terminal device 30 of the requesting user and the terminal device 30 of the invited user may be immediately allowed without performing the push notification on the terminal device 30 of the invited user who is invited to the new voice chat.

In other embodiment of the invention, when a voice chat initiation request is received from the terminal device 30, the state monitor unit 53 of the server 10 may firstly check whether an invited user is in the available state where the invited user is able perform a new voice chat. For example, when the invited user is logged in the voice chat service (this can be determined by referring to the "login state" of the user information management table 51*a*) and the invited user is not performing a voice chat with other user (a voice chat in other chat unit) (this can be determined by referring to the chat unit information management table 51b), it may be determined that the invited user is in the available state where the invited user is able perform the new voice chat. When it is determined that the invited user is available to perform the new voice chat, the state monitor unit 53 of the server 10 may determine that both the requesting user and the invited user may are in the available state and may set a chat unit (create a new record in the chat unit information management table 51b). Subsequently the function of the voice chat control unit 54 may immediately enable the voice chat communication between the terminal device 30 of the requesting user and the terminal device 30 of the invited user. In other embodiment, when it is determined that the invited user is not in the available state in which he/she is not able to perform the new voice chat, a push notification same as the above-described embodiment may be transmitted to the terminal device 30 of the invited user.

In other embodiment, when it is determined that the invited user is in the available state and a voice chat communication is immediately enabled, the microphone 33a of the terminal device 30 of the invited user may be disabled at the start of the voice chat. When the invited user subsequently selects the microphone icon 92 on the voice chat screen 70C, the microphone 33a is enabled.

In other embodiment, when the invited user is in the available state where the invited user is able to perform a new voice chat, a voice chat communication between the terminal device 30 of the requesting user and the terminal device 30 of the invited user is immediately enabled once the requesting user transmits the voice chat initiation request, therefore the user can easily start a voice chat with other user(s).

In the above-described embodiment, a user is not able to perform a voice chat with other user (a voice chat in other chat unit) while the user is performing another voice chat. Alternatively a voice chat communication of more than one voice chat with different members (a plurality of chat units) may be simultaneously enabled. In this case, when a new voice chat is started, a sound volume of a voice chat which the user is currently performing may be turn down. More specifically, the sound volume of the audio data corresponding to each voice chat (chat unit) may be adjusted by a function of the voice chat control unit 54. In this way, even while the user is performing a voice chat, another voice chat (another chat unit) can be immediately started.

The processes and procedures described and illustrated herein may also be implemented by software, hardware, or any combination thereof other than those explicitly stated for the embodiments. More specifically, the processes and procedures described and illustrated herein may be implemented by the installation of the logic corresponding to the processes into a medium such as an integrated circuit, a volatile memory, a non-volatile memory, a magnetic disk, or an optical storage. The processes and procedures described and illustrated herein may also be installed in the form of a computer program, and executed by various computers.

Even if the processes and the procedures described herein are executed by a single apparatus, software piece, component, or module, such processes and procedures may also be executed by a plurality of apparatuses, software pieces, components, and/or modules. Even if the data, tables, or databases described herein are stored in a single memory, such data, tables, or databases may also be dispersed and stored in a plurality of memories included in a single apparatus or in a plurality of memories dispersed and arranged in a plurality of apparatuses. The elements of the software and the hardware described herein can be integrated into fewer constituent elements or can be decomposed into more constituent elements.

With respect to the use of substantially any plural and/or singular terms herein, those having skill in the art can translate from the plural to the singular and/or from the singular to the plural as is appropriate to the context.

LIST OF REFERENCE NUMBERS 10 server
30 terminal device
51 information storage unit
52 notification information transmission unit
53 state monitor unit
54 voice chat control unit
70 voice chat service screen
70A voice chat service screen (initial screen)
70B voice chat service screen (friend details screen)
70C voice chat service screen (voice chat screen)
80 friend list screen
100 home screen
110 invitation notification screen

What is claimed is:

1. A voice chat management device that manages a voice chat between users, comprising:
   one or more computer processors configured to execute instructions,
   the one or more computer processors, in response to execution of the instructions, further configured to:
   transmit predetermined notification information to a terminal device of a second user in response to receiving a voice chat initiation request to chat with the second user from a terminal device of a first user;
   monitor whether the first user and the second user whose terminal device has received the predetermined notification information are in an available state such that the user is able to perform a voice chat; and
   enable a voice chat communication between the terminal device of the first user and the terminal device of the second user when the first user and the second user are in the available state, wherein:
   the voice chat is performed when each of the first and second users is logged into a voice chat service,
   the available state includes at least a state in which the respective user is logged into the voice chat service,
   the transmission of the predetermined notification information includes transmitting the predetermined notification information to the terminal device of the second user in response to the voice chat initiation request to chat with the second user who is not logged into the voice chat service, and transmitting the predetermined notification information to the terminal device of the second user in response to the voice chat initiation request to chat with the second user who is logged into the voice chat service, and
   the predetermined notification information is configured such that the second user becomes in the available state when the second user performs a predetermined action in response to the predetermined notification information.

2. A voice chat management device that manages a voice chat between users, comprising:
   one or more computer processors configured to execute instructions, the one or more computer processor, in response to execution of the instructions, further configured to:
determine, in response to receiving a voice chat initiation request to chat with the second user from a terminal device of a first user, whether a second user is in an available state where the second user is able to perform a voice chat;
transmit predetermined notification information to the terminal device of the second user, when it is determined that the second user is not in the available state; and
enable a voice chat communication between the terminal device of the first user and a terminal device of the second user when it is determined that the second user is in the available state,
wherein the enabling of the voice chat communication includes disabling an audio input unit of the terminal device of the second user at a start of the voice chat communication.

3. The voice chat management device of claim 2, wherein the one or more computer processor, in response to execution of the instructions, further configured to:
monitor whether the first user and the second user whose terminal device has received the predetermined notification information are in the available state such that the user is able to perform the voice chat; and
enable the voice chat communication between the terminal device of the first user and the terminal device of the second user when the first user and the second user are in the available state.

4. The voice chat management device of claim 3, wherein the predetermined notification information is configured such that the second user becomes in the available state when the second user performs a predetermined action in response to the predetermined notification information.

5. The voice chat management device of claim 2, wherein:
the voice chat is performed when each of the first and second users is logged into a voice chat service, and
the available state includes at least a state in which the respective user is logged into the voice chat service.

6. The voice chat management device of claim 1, wherein the available state includes at least a state in which the respective user is not performing a voice chat with another user.

7. The voice chat management device of claim 1, wherein the enabling of the voice chat communication includes transmitting, to the terminal device of the second user, audio data of sound/voice that is input via an audio input unit of the terminal device of the first user, and transmitting, to the terminal device of the first user, audio data of sound/voice that is input via an audio input unit of the terminal device of the second user.

8. A method for management of a voice chat performed between users by using one or more computers, comprising causing the one or more computers to:
transmit predetermined notification information to a terminal device of a second user in response to receiving a voice chat initiation request to chat with the second user from a terminal device of a first user;
monitor whether the first user and the second user whose terminal device has received the predetermined notification information are in an available state such that the user is able to perform a voice chat; and
enable a voice chat communication between the terminal device of the first user and the terminal device of the second user when the first user and the second user are in the available state, wherein:

the voice chat is performed when each of the first and second users is logged into a voice chat service,
the available state includes at least a state in which the respective user is logged into the voice chat service,
the transmission of the predetermined notification information includes transmitting the predetermined notification information to the terminal device of the second user in response to the voice chat initiation request to chat with the second user who is not logged into the voice chat service, and transmitting the predetermined notification information to the terminal device of the second user in response to the voice chat initiation request to chat with the second user who is logged into the voice chat service, and
the predetermined notification information is configured such that the second user becomes in the available state when the second user performs a predetermined action in response to the predetermined notification information.

9. A method for management of a voice chat performed between users by using one or more computers, comprising causing the one or more computers to:
determine, in response to receiving a voice chat initiation request to chat with the second user from a terminal device of a first user, whether a second user is in an available state where the second user is able to perform a voice chat;
transmit predetermined notification information to the terminal device of the second user, when it is determined that the second user is not in the available state; and
enable a voice chat communication between the terminal device of the first user and a terminal device of the second user when it is determined that the second user is in the available state,
wherein the enabling of the voice chat communication includes disabling an audio input unit of the terminal device of the second user at a start of the voice chat communication.

10. The voice chat management device of claim 1, wherein the voice chat initiation request is performed responsive to the first user selecting an audio stamp from among a plurality of audio stamps.

11. The voice chat management device of claim 10, wherein audio stamp identification information that identifies the selected audio stamp is received from the terminal device of the first user.

12. The voice chat management device of claim 11, wherein the one or more computer processors are further configured to:
transmit the predetermined notification information, notifying the second user of an invitation to the voice chat from the first user, and the audio stamp identification information to the terminal device of the second user.

13. The voice chat management device of claim 1, wherein an appearance on a voice chat service screen of the user device indicates whether the user is in the available state.

14. The voice chat management device of claim 13, wherein an invitation notification screen is overlaid on the voice chat service screen, if the second user is logged into the voice chat service and the second user is not performing a voice chat with another user.

15. The voice chat management device of claim 13, wherein the voice chat service screen displays the second user receiving a push notification regarding the voice chat, if the second user is logged into the voice chat service and performing a voice chat with another user.

16. The voice chat management device of claim 1, wherein a notification is displayed at an end of a home screen by an operating system of the terminal device of the second user, if the second user is not logged into the voice chat service when the terminal device of the second user receives the predetermined notification information.

17. The voice chat management device of claim 14, wherein the voice chat initiation request is performed responsive to the first user selecting an audio stamp from among a plurality of audio stamps, and
    wherein the overlaying of the invitation notification screen on the voice chat service screen is accompanied by a playing of the audio stamp.

18. The voice chat management device of claim 1, wherein the voice chat initiation request is performed and the voice chat is immediately enabled, responsive to the first user selecting the second user, the first and second users being logged into the voice chat service.

19. The voice chat management device of claim 1, wherein the second user is switched into the available state when push notification information provided by the voice chat management device is displayed at the terminal device of the second user or when the second user sees or confirms the notification information.

20. The voice chat management device of claim 1, wherein the voice chat is performed notwithstanding the second user performing a voice chat with another user.

\* \* \* \* \*